US012809653B2

(12) United States Patent
Ilan et al.

(10) Patent No.: US 12,809,653 B2
(45) Date of Patent: Nov. 24, 2026

(54) NETWORKING OVERHEAD REDUCTION FOR ENCRYPTED VIRTUAL MACHINES

(71) Applicant: Red Hat, Inc., Raleigh, NC (US)

(72) Inventors: Amnon Ilan, Raanana (IL); Michael Tsirkin, Yokneam Illit (IL)

(73) Assignee: Red Hat, LLC, Raleigh, NC (US)

( * ) Notice: Subject to any disclaimer, the term of this patent is extended or adjusted under 35 U.S.C. 154(b) by 228 days.

(21) Appl. No.: 18/088,003

(22) Filed: Dec. 23, 2022

(65) Prior Publication Data

US 2024/0211289 A1 Jun. 27, 2024

(51) Int. Cl.
*G06F 9/455* (2018.01)

(52) U.S. Cl.
CPC .................... *G06F 9/45558* (2013.01); *G06F 2009/45583* (2013.01); *G06F 2009/45587* (2013.01)

(58) Field of Classification Search
CPC ....... G06F 9/45558; G06F 2009/45583; G06F 2009/45587
See application file for complete search history.

(56) References Cited

U.S. PATENT DOCUMENTS 8,108,508 B1 * 1/2012 Goh .................... G06F 11/3013 709/224
9,311,250 B2 4/2016 Van De Ven et al.
9,398,121 B1 * 7/2016 Brandwine ............. H04L 69/24
9,652,634 B2 5/2017 Wang et al.
10,102,057 B2 10/2018 Karamanolis et al.
10,445,188 B2 10/2019 Zamir
10,877,822 B1 * 12/2020 Wang ...................... G06F 9/544
11,232,030 B2 1/2022 Tsirkin
11,354,420 B2 6/2022 Tsirkin et al.
2007/0195767 A1 * 8/2007 Yonemoto ............... H04L 45/00 370/389
2008/0276056 A1 * 11/2008 Giacomoni ........... G06F 12/128 711/E12.001
2009/0083756 A1 * 3/2009 Kim ........................ G06F 9/545 719/312
2011/0317199 A1 * 12/2011 Makishima ........... G06F 3/1222 358/1.13
2013/0117745 A1 * 5/2013 Kamiyama ............. G06F 21/10 718/1

(Continued)

OTHER PUBLICATIONS

Li, Shih-Wei et al., "Protecting Cloud Virtual Machines from Hypervisor and Host Operating System Exploits", Columbia University, Aug. 2019, 19 pages.

*Primary Examiner* — Dhairya A Patel
*Assistant Examiner* — Eui H Kim
(74) *Attorney, Agent, or Firm* — Dority & Manning, P.A.

(57) ABSTRACT

Systems and methods for networking overhead reduction for encrypted virtual machines are disclosed. A method may include receiving, by a virtual machine running on a host computer system, a request to send a data packet to a specified recipient via a network; identifying a network connection to the specified recipient; determining whether the identified network connection is associated with an encryption option indicating data encryption; responsive to determining that the identified network connection is associated with the encryption option, storing the data packet in a shared memory buffer of the host computer system; and notifying an input/output (I/O) device driver of an address of the shared memory buffer.

16 Claims, 7 Drawing Sheets

(56) References Cited

U.S. PATENT DOCUMENTS

| | | | | |
|---|---|---|---|---|
| 2015/0248357 | A1* | 9/2015 | Kaplan | G06F 12/1408 713/193 |
| 2017/0364287 | A1* | 12/2017 | Antony | G06F 11/0757 |
| 2018/0332078 | A1* | 11/2018 | Kumar | H04L 63/0815 |
| 2019/0102303 | A1* | 4/2019 | Wang | G06F 12/0862 |
| 2019/0273727 | A1* | 9/2019 | Eckert | H04L 63/0428 |
| 2020/0186507 | A1* | 6/2020 | Dhanabalan | H04L 63/0272 |
| 2020/0387405 | A1* | 12/2020 | Xiao | G06F 12/109 |
| 2021/0103556 | A1 | 4/2021 | Nagrale et al. | |
| 2021/0263779 | A1* | 8/2021 | Haghighat | G06F 11/302 |
| 2022/0027179 | A1* | 1/2022 | Caldarale | G06F 9/45545 |
| 2022/0222184 | A1 | 7/2022 | Irwin et al. | |
| 2023/0185901 | A1* | 6/2023 | Yin | G06F 21/53 726/1 |

* cited by examiner

NETWORKING OVERHEAD REDUCTION FOR ENCRYPTED VIRTUAL MACHINES

TECHNICAL FIELD

The disclosure is generally related to virtualization systems and is more specifically related to networking overhead reduction for encrypted virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
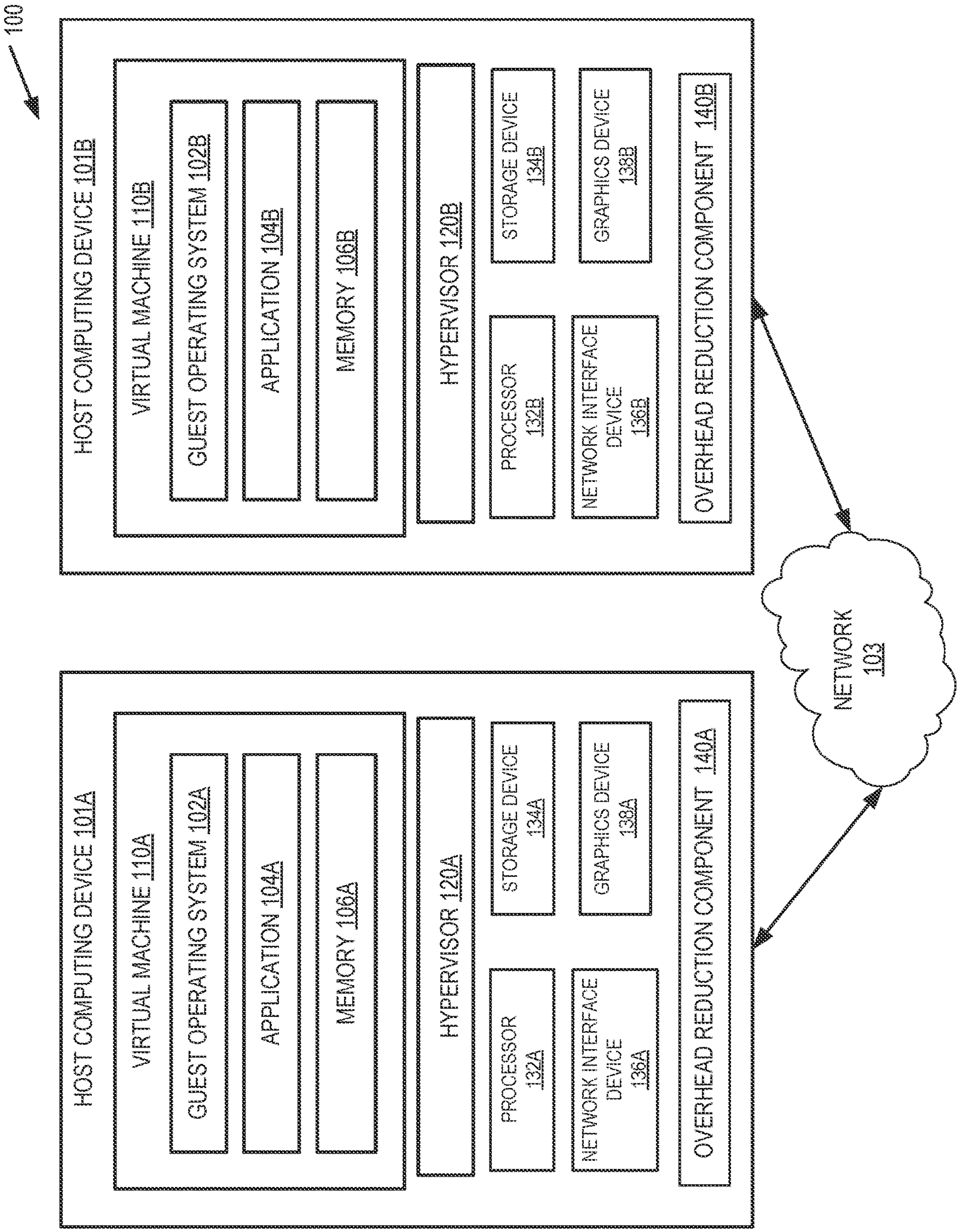
FIG. 1 depicts a schematic diagram illustrating an example computing system in accordance with one or more aspects of the present disclosure.

Described herein are methods and systems for networking overhead reduction for encrypted virtual machines (VMs). Encrypted virtualization provides a security paradigm that protects VMs from physical threats, as well as other VMs and a hypervisor that manages the VMs. In one implementation, encrypted VMs may be provided using a Secure Encrypted Virtualization (SEV) feature set. For example, when encrypted virtualization is enabled, an encryption engine (e.g., firmware, circuitry of a processing device, etc.) of a host machine can associate each encrypted VM hosted by the host machine with a VM-specific key that is not accessible to other VMs or the hypervisor managing the encrypted VM. The VM-specific key may be generated and maintained by the encryption engine and may only be accessible to the encryption engine. Private memory of a VM may be encrypted with the VM-specific key. Accesses to (e.g., reading from or writing to) the private memory are controlled by the encryption engine. The encryption engine thus provides strong cryptographic isolation between VMs, as well as between the VMs and the hypervisor.

However, because the private memory of the VM is encrypted and inaccessible to the hypervisor that manages the VM, as well as other VMs, to support the communication of the encrypted VM with input/output (I/O) devices, an unencrypted memory buffer is allocated in the memory of the VM, which is used for storing the data being sent/received via input/output (I/O) devices, such as network interface cards (NICs). The copying operations can cause overhead for networking processes.

Aspects of the disclosure address the above deficiencies and other deficiencies by providing mechanisms (e.g., systems, methods, machine-readable media, etc.) for networking overhead reduction by decreasing copying operations between the private memory and the public memory of encrypted VMs. An encrypted application (such as a VM) running on a computing device may intend to send or receive a data packet over a network via, a network interface controller (NIC). A data packet refers to a portion of data being sent or received through the network and may additionally include metadata, for example, in its header.

A guest operating system running on the computing device can use an encryption option (e.g., a socket option) to declare an end-to-end data encryption. When the guest operating system is allocating a memory buffer to hold the data packet (e.g., when reading the data packet from application or when encrypting a virtual private network), the guest operating system may check whether the data packet to be sent via a network connection has already been end-to-end encrypted, for example, by determining whether the network connection is associated with an encryption option, and responsive to determining that the network connection is associated with the encryption option, the guest operating system may store the data packet to a public (i.e., shared) memory buffer. The encryption option (e.g., socket option) refers to a notification (e.g., a flag bit) attached to a specified network connection (e.g., through a socket—an endpoint identifier of the specified network connection) to indicate an end-to-end encryption. The end-to-end encryption refers to an encryption where only the source party (sender) and the destination party (recipient) for communication of the data can access that data using encryption/decryption mechanisms, and no intermediate or other parties can access the data.

Because the data packet is already stored in a shared memory buffer, the data packet may be delivered to a recipient (e.g., a socket associated with a computer application program running on the computing device) by using an address of the shared memory buffer, thus, eliminating the need to copy the data packet from or to a private memory. Otherwise, in response to determining that the data packet is not associated with an encryption option, the guest operating system needs to allocate a private memory (e.g., the private buffer) to store the data packet, which requires copying the data packet from or into a shared memory buffer to allow access.

In some implementations, to create the encryption option (e.g., socket option), the guest operating system can identify a network connection and use a parameter of a system call associated with the network connection or a parameter of the network connection as the encryption option. In some implementations, the guest operating system can programmatically set or clear the parameter of a system call. In some implementations, the guest operating system can automatically set the parameter of all network connections created by an operating system that has an encryption function or is encrypted. In some implementations, the guest operating system can use a parameter of a socket call for creating a socket as the socket option. In some implementations, the guest operating system can programmatically set or clear the parameter of a socket call for creating a socket. In some implementations, the guest operating system can automatically set a parameter of all sockets created by an operating system that has an encryption function or is encrypted.

In some implementations, to use the encryption option (e.g., socket option), the guest operating system can identify a data packet, determine whether a network connection to be used for the data packet is associated with an encryption option, and responsive to determining that the network connection is associated with the encryption option, store the data packet in a shared memory buffer of the computing device.

In some implementations, the guest operating system can receive, from a computing application program running on an encrypted virtual machine, a request to send a data packet via a specified network connection to an identified recipient on the network. Similarly, as described above, the guest operating system can determine whether the specified network connection is associated with an encryption option indicating end-to-end encryption, and responsive to determining that the specified network connection is associated with an encryption option, store the data packet to a shared memory buffer of the computing device. In addition, the guest operating system can store a header along with the data packet, where the header includes control information for transmission of the data packet. The guest operating system can then send an address of the shared memory buffer to the recipient. In some cases, when the recipient already has access to the shared memory buffer of the computing device, the guest operating system can send the address of the shared memory buffer as an indication that the data packet is in a shared memory that no copying of the data packet to a memory of the recipient is necessary. As such, when sending a data packet, the system avoids a step of copying the data packet from a private memory that originally stores the data packet for accessing by the computing application program to a buffer used by an operation system, and the system also avoids a step of copying the data packet from the buffer used by the operation system to the shared memory buffer.

In some implementations, the guest operating system can receive, for example, via a specified network connection, a data packet from a sender. The guest operating system can store the received data packet in the shared memory buffer of the computing device. Similarly, as described above, the guest operating system can determine whether the specified network connection is associated with an encryption option indicating end-to-end encryption, and responsive to determining that the specified network connection is associated with the encryption option, keep the data packet stored in the shared memory buffer of the computing device. For example, the data packet may include a header (e.g., containing metadata, such as a checksum of the payload) and a payload. The guest operating system may check the header of the data packet to determine whether information regarding a network connection included in the data packet indicates that the network connection is associated with an encryption option, for example, in a form of a bit flag. Upon determining that information regarding a network connection included in the data packet indicates that the network connection is associated with an encryption option, the guest operating system may determine that the network connection is associated with the encryption option and store the data packet in a shared memory buffer of the computing device without copying the data packet to or from a private memory of the computing device.

The guest operating system can then store an address of the shared memory buffer in the private memory of the computing device, serving as a record indicating that the data packet is stored in a shared memory. The guest operating system would also use this record when the virtual machine (or application) requests to send the data packet to other components, in such case, since the data packet is already in a shared memory rather than a private memory, the guest operating system only needs to send the address of the shared memory buffer associated with the data packet to other components. As such, when receiving a data packet, the system avoids a step of copying the data packet from a public memory that receives the data packet to a buffer used by an operation system, and the system also avoids a step of copying the data packet from the buffer used by the operation system to a private memory of the computing device. When the data packet stored in the shared memory is later requested to be sent to other components, the system also avoids a step of copying the data packet from a private memory to a shared memory that would be traditionally performed.

Implementations of the disclosure provide a technical improvement over the conventional systems by providing a mechanism that enables reducing transmission of data for encrypted VMs. Compared to the conventional system, the present disclosure does not require multiple steps of data transmission between a private memory and a shared memory of the encrypted VMs when receiving or sending data. In addition, partial data (e.g., an address of a shared memory) is used instead of full data for transmission, resulting in more efficient operations of encrypted VMs and enhanced security for encrypted VMs running in public clouds.

FIG. 1 illustrates a virtualization system 100 in which embodiments of the present disclosure may operate. It should be noted that other architectures for virtualization system 100 (also referred to herein as system 100) are possible, and that the implementation of a virtualization system utilizing embodiments of the disclosure are not necessarily limited to the specific architecture depicted by FIG. 1.

The virtualization system 100 may include host computing devices 101A, 101B, which may all be communicably connected over a network 103. Each of host computing devices 101A, 101B may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement networking overhead reduction for encrypted virtual machines in accordance with the present disclosure.

The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host computing devices 101A, 101B may belong to a cluster comprising additional computer systems not depicted in FIG. 1, while in some other implementations, host computing devices 101A, 101B may be independent systems that are capable of communicating via network 103.

The host computing devices 101A, 101B can each include hardware resources that provides hardware features for performing computing tasks. In one example, one or more of the hardware resources may correspond to a physical device of host computing device 101A or 101B. In another example, one or more of the hardware resources may be provided by hardware emulation and the corresponding physical device may be absent from host computing device 101A or 101B. For example, host computing device 101A or 101B may be a server machine that does not include a graphics device (e.g., graphics card) or includes a graphics device that does not support a particular hardware feature. Host computing device 101A or 101B may provide the hardware feature of the hardware resource by emulating a portion of the hardware resource (e.g., provide a virtualized graphics device). The emulation of a portion of a hardware resource may be provided by hypervisor, virtual machine, host operating system, another hardware resource, or a combination thereof.

In the example shown in FIG. 1, hardware resources of host computing device 101A may include a processor 132A, a storage device 134A, a network interface device 136A, a graphics device 138A, other physical or emulated devices, or combination thereof. The hardware resources of host computing device 101B may include a processor 132B, a storage device 134B, a network interface device 136B, a graphics device 138B, other physical or emulated devices, or combination thereof. Processor 132A or 132B may refer to devices capable of executing instructions encoding arithmetic, logical, or I/O operations. Processor 132A or 132B may be a single core processor, which may be capable of executing one instruction at a time (e.g., single pipeline of instructions) or a multi-core processor, which may simultaneously execute multiple instructions. Storage device 134A or 134B may include any data storage that is capable of storing digital data, such as physical memory devices including volatile memory devices (e.g., RAM), non-volatile memory devices (e.g., NVRAM), other types of memory devices, or a combination thereof. Storage device 134A or 134B may include mass storage devices, such as solid-state storage (e.g., Solid State Drives (SSD)), hard drives, other persistent data storage, or a combination thereof. Network interface device 136A or 136B may provide access to a network internal to the host computing system or external to the host computing system (e.g., network 103) and in one example may be a network interface controller (NIC). Graphics device 138A or 138B may provide graphics processing for the host computing system and/or one or more of the virtual machines. One or more of the hardware resources may be combined or consolidated into one or more physical devices or may partially or completely emulated by hypervisor as a virtual device.

A host computing device 101A can include one or more hypervisors (e.g., hypervisor 120A). A host computing device 101B can include one or more hypervisors (e.g., hypervisor 120B). Hypervisor 120A or 120B may also be known as a virtual machine monitor (VMM) and may provide one or more virtual machines with direct or emulated access to hardware resources. In the example shown, hypervisor 120A or 120B may run directly on the hardware of host computing system (e.g., bare metal hypervisor). In other examples, hypervisor 120 may run on or within a host operating system (not shown). Hypervisor 120A or 120B may manage system resources, including access to hardware resources. Hypervisor 120A or 120B, though typically implemented as executable code, may emulate and export a bare machine interface to higher-level executable code in the form of virtual processor and data storage (e.g., guest memory). Higher-level executable code may comprise a standard or real-time operating system (OS), may be a highly stripped down operating environment with limited operating system functionality and may not include traditional OS facilities, etc. Hypervisor 120A or 120B may support any number of virtual machines (e.g., a single VM, one hundred VMs, etc.).

A host computing device 101A can host one or more VMs (e.g., VMs 110A) and can execute an operating system to manage its resources. A host computing device 101B can host one or more VMs (e.g., VM 110B) and can execute an operating system to manage its resources. Virtual machine 110A or 110B may execute guest executable code that uses an underlying emulation of physical resources. Virtual machine 110A or 110B may support hardware emulation, full virtualization, para-virtualization, operating system-level virtualization, or a combination thereof. The guest executable code may include a guest operating system 102A or 102B, a guest application 104A or 104B, a guest memory 106A or 106B, etc. Virtual machine 110A or 110B may execute one or more different types of guest operating system 102A or 102B, such as Microsoft®, Windows®, Linux®, Solaris®, etc., respectively. Guest operating system 102A or 102B may manage the computing resources of virtual machine 110A or 110B and manage the execution of one or more computing processes, respectively.

A computing process may comprise one or more streams of execution for executing instructions. The stream of execution may include a sequence of instructions that can be executed by one or more processing devices (e.g., physical or virtual processors). The computing process may be managed by a kernel of guest operating system 102A or 102B, hypervisor 120A or 120B, a host operating system (not shown), or a combination thereof. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters, and a state (e.g., running, ready, waiting, start, done).

Memory 104A,104B may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). Memory 104A or 104B may each include at least one private memory and at least one shared memory, and the details of private memory and share memory are illustrated below with respect to FIG. 2.

In one implementation, host computing device 101A or 101B may reside in different clouds, such as a first cloud and a second cloud, respectively. In some embodiments, the first cloud may be a private cloud. The second cloud may be a public cloud or a hybrid cloud. The public cloud may be a cloud service that is accessible to the public, such as Amazon's Elastic Compute Cloud™ (ECC), Microsoft's Azure™ service, or Google's Compute Engine™ or other similar cloud service. The private cloud may be similar to a public cloud but may be operated for a single organization and may be hosted and or managed by the organization or by a third-party. The hybrid cloud may be a cloud computing service that is composed of a combination of private, public and community cloud services, from different service providers.

Host computing device 101A or 101B may include an overhead reduction component 140A or 140B, respectively, for reducing overhead in data transmission. The details of overhead reduction component 140A or 140B for implementing overhead reduction are described in connection with FIG. 2.

Figure 2:
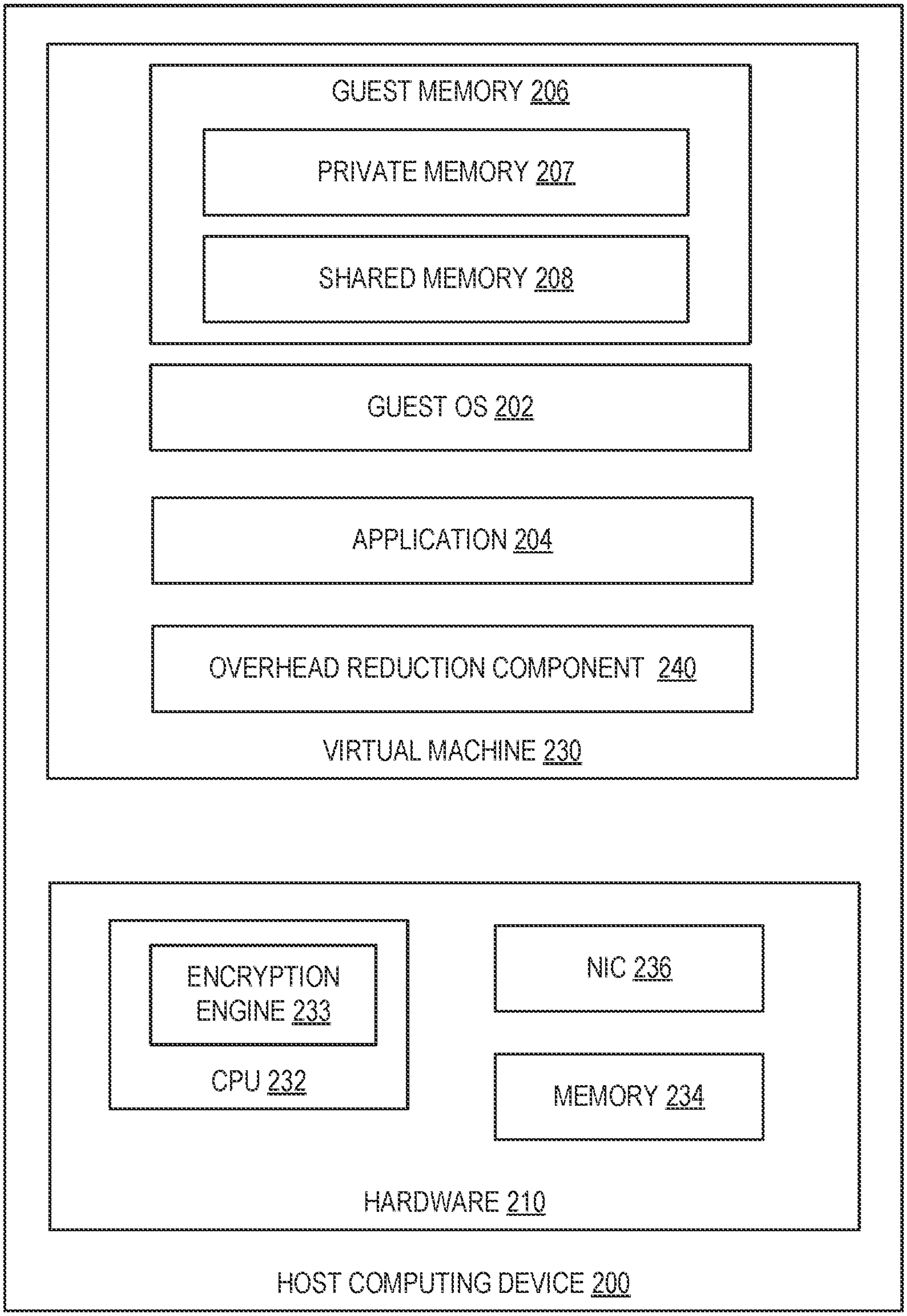
FIG. 2 schematically illustrates an example of a host computing device according to some implementations of the disclosure.

FIG. 2 is a block diagram depicting a host computing device 200 implementing encrypted virtualization in accordance with an implementation of the present disclosure. In one implementation, host computing device 200 is the same as host computing device 101A and/or host 101B as described with respect to FIG. 1. As illustrated, host computing device may include hardware 210, a hypervisor (not shown), a virtual machine 230, and/or any other suitable component. Hypervisor may be the same as hypervisor 120 A, 102 B as described with respect to FIG. 1 and may abstract components of hardware 210 and present this abstraction to virtual machine 230 and one or more other virtual machines hosted by host computing device 200 as virtual devices, such as virtual processors, virtual memory, virtual I/O devices, etc. Hardware 210 may include CPU 232, memory 234, network interface controller (NIC) 236, one or more I/O devices (not shown), etc. In some implementations, CPU 232 may be the same as processor 132A, 132B; Memory 234 may be the same as memory 134A, 134B; NIC 236 may be the same as network interface deice 136A, 136B; I/O devices may be same as graphics device 138A, 138B, as described with respect to FIG. 1. More or fewer components than illustrated as part of host computing device 200 in FIG. 2 may be implemented in computing device 200, and implementations of the disclosure are not limited to those specifically described and illustrated herein.

CPU 212 may further include an encryption engine 233. Encryption engine 233 can provide an encrypted virtualization mechanism that encrypts one or more of VMs (e.g., VM 230) to protect the VMs from physical threats, as well as from other VMs and the hypervisors. In one implementation, the encryption engine 233 may be implemented as hardware circuitry of the CPU 232. In some implementations, encryption engine 233 may be provided as firmware installed on the host computing device 200. The encryption engine 233 may implement a Secure Encrypted Virtualization (SEV) feature set provided by Advanced Micro Devices (AMD®). A VM protected by the encrypted virtualization mechanism is also referred to herein as an "encrypted virtual machine" or "encrypted VM."

When encrypted virtualization is enabled, the encryption engine 233 can tag all code and data with a VM or application identifier (ID) that indicates which VM or application that the data originated from or is intended for. This tag is kept with the data and prevents that data from being used by any process other than the owner. Private memory of an encrypted VM may be encrypted with an ID-specific key. The ID-specific key is associated with the encrypted VM or application and is not accessible to a hypervisor managing the encrypted VM or any other VM or application. The ID-specific key may be associated with a VM or application ID of the encrypted VM. In some embodiments, the ID-specific key may be generated and maintained by the encryption engine 233. Accesses to the memory page may be encrypted and/or decrypted by encryption engine 233. As such, the encryption engine 233 may provide cryptographic isolation between VMs, as well as between the VMs and a hypervisor managing the VMs. In some embodiments, the host computing device 200 may host one or more encrypted VMs and/or one or more unencrypted VMs. The host computing device 200 may host any suitable number of encrypted VMs and/or unencrypted VMs.

In some implementations, the encryption engine 233 can tag all code and data with IDs that indicate which VM or application that the data originated from (i.e., one communication end) and is intended for (i.e., the other communication end), which is referred to as end-to-end encryption. This tag is kept with the data and prevents that data from being used by any process other than the two end parties of the communication. In some implementations, the encryption engine 233 can perform the end-to-end encryption of data and send a notification of the end-to-end encryption to the overhead reduction component 240 so that the overhead reduction component 240 can add a socket option to a specified network connection used for data communication. The socket option refers to a notification (e.g., a flag bit) attached to a socket that indicates whether the data is end-to-end encrypted.

Virtual machine 230 can execute a guest operating system (OS) 202 which may utilize the underlying virtual devices, including virtual processors, virtual memory (e.g., guest memory 206), and virtual I/O devices. One or more applications and/or services may be running on virtual machine 230 under the guest operating system. In some embodiments, virtual machine 230 may be an encrypted virtual machine. Guest memory 206 may include private memory 207 that is encrypted with an encryption key associated with virtual machine 230 or application 204 (also referred to as the "ID-specific key"). The ID-specific key may be generated and/or managed by encryption engine 233. The ID-specific key is not accessible to hypervisor, other virtual machine running on host computing device 200, or any other device. The ID-specific key may be generated and/or managed by encryption engine 233. For example, contents of private memory 207 may be encrypted and/or decrypted by encryption engine 214 using the ID-specific key. In some embodiments, encryption engine 233 may identify a particular memory page as a page of private memory 207 (e.g., by determining that a bit of an address of the memory page (e.g., a physical address) indicates that encrypted virtualization is enabled for the memory page). Accesses to the memory page (e.g., writing to or reading from the memory page) may then be encrypted and decrypted by encryption engine 233 using the ID-specific key.

Guest memory 206 may also include shared memory 208. Shared memory 208 may be accessible to hypervisor and/or one or more other devices that have been granted access to shared memory 208. In some implementations, shared memory 208 may be accessible to all components running on the host computing device 200. For example, shared memory 208 may be encrypted with an encryption key that is accessible to hypervisor and virtual machine 230. The virtual machine 230 can use shared memory 208 to communicate with hypervisor and/or one or more other virtual machines that have access to shared memory 208. For example, to transmit certain data to hypervisor 220, guest OS 202 can store the data in shared memory 208. Hypervisor can then retrieve the data from shared memory 208.

In some embodiments, guest OS 202 can designate one or more particular portions of the guest memory 206 as being protected as private memory. For example, guest OS 202 can select one or more pages of guest memory 206 to be encrypted with the ID-specific key. Guest OS 202 can also select one or more pages of guest memory 206 as being shared memory 208. In some embodiments, host computing device 200 may require certain types of memory (e.g., instruction pages, page tables, etc.) to be private to protect virtual machine 230.

In one implementation, virtual machine 230 includes overhead reduction component 240 capable to determining whether a data packet to be transmitted/received through a network connection has been end-to-end encrypted and based on the determination, storing the data packet in the shared memory without copying the check of data from/into the private memory. The overhead reduction component 240 may reside on a designated computer system (e.g., a server computer, a desktop computer, etc.) or be part of the host computing device 200 (or host computing device 101A, 101B) or another computing device. The overhead reduction component 240 may be part of the virtual machine 230 as illustrated in FIG. 2, part of a hypervisor (not shown), or combination thereof. Although shown as discrete components of the virtual machine 230, the overhead reduction component 240 may be separate components coupled to virtual machine 230.

The overhead reduction component 240 can manage networking overhead by issuing instructions to hypervisor, virtual machine 230, and/or application 204. The overhead reduction component 240 can issue the instructions after determining a data packet has been end-to-end encrypted, including storing the data packet to one or more storage devices, sending partial data for overhead reduction, etc.

In some implementations, the overhead reduction component 240 may, upon identifying a data packet received from or to be sent to the private memory 207, NIC 236 or any other component of the host computing device 200 via a specified network connection, determine whether specified network connection is associated with an encryption option indicating that the data packet is encrypted. Upon determining that the specified network connection is associated with an encryption option, the overhead reduction component 240 may store the data packet to the shared memory 208.

In some implementations, the overhead reduction component 240 can receive a request, from the virtual machine 230 (or the application 204), to send a data packet via a specified network connection through NIC 236 to a recipient, for example, an external component of the host computing device 200 or another component of the host computing device 200. At this time, the data packet is stored in the private memory 207. As described above, the overhead reduction component 240 can determine whether the specified network connection is associated with an encryption option, and responsive to determining that the specified network connection is associated with the encryption option, store the data packet in the shared memory 208. The overhead reduction component 240 can then send, to the recipient, for example, via NIC 236, an address of the shared memory 208 corresponding to the data packet. In some cases, when the recipient already has access to the shared memory 208, the overhead reduction component 240 can send the address of the shared memory 208 corresponding to the data packet as an indication that the data packet is in the shared memory 208 that no copying of the data packet to a recipient's memory is necessary. As such, the overhead reduction component 240 avoids a step of copying the data packet from the private memory 207 to a buffer used by guest OS 202, and the overhead reduction component 240 also avoids a step of copying the data packet from the buffer used by guest OS 202 to the shared memory 208.

In some implementations, the overhead reduction component 240 can receive, via a specified network connection through NIC 236, a data packet from a sender, for example, an external component of the host computing device 200 or another component of the host computing device 200. The overhead reduction component 240 can store the received data packet in the shared memory 208. As described above, the overhead reduction component 240 can determine whether the specified network connection is associated with an encryption option, and responsive to determining that the specified network connection is associated with the encryption option, keep the data packet stored in the shared memory 208. The overhead reduction component 240 can send an address of the shared memory associated with the data packet to the private memory 207, serving as a record indicating that the data packet is stored in the shared memory 208. As such, the overhead reduction component 240 avoids a step of copying the data packet from the public memory 208 to a buffer used by guest OS 202, and the overhead reduction component 240 also avoids a step of copying the data packet from the buffer used by guest OS 202 to the private memory 207.

FIGS. 3, 4, 5, and 6 depict flow diagrams for illustrative examples of methods 300, 400, 500, and 600 for overhead reduction for encrypted VMs. Method 300 includes a method for creating a socket option to a data packet. Method 400 includes a method of overhead reduction for an encrypted VM. Method 500 includes a method of overhead reduction for sending a data packet. Method 600 includes a method of overhead reduction for receiving a data packet. Methods 300, 400, 500, and 600 may be performed by processing devices that may comprise hardware (e.g., circuitry, dedicated logic), computer readable instructions (e.g., run on a general purpose computer system or a dedicated machine), or a combination of both. Methods 500, 600, and 700 and each of their individual functions, routines, subroutines, or operations may be performed by one or more processors of the computer device executing the method. In certain implementations, methods 300, 400, 500, and 600 may each be performed by a single processing thread. Alternatively, methods 300, 400, 500, and 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In some embodiments, methods 300, 400, 500, and 600 may be performed by a kernel of a hypervisor as shown in FIG. 1 or by an executable code of a host machine (e.g., a host operating system or firmware), an executable code of a virtual machine (e.g., a guest operating system or virtual firmware), or any other executable code, or a combination thereof.

Figure 3:
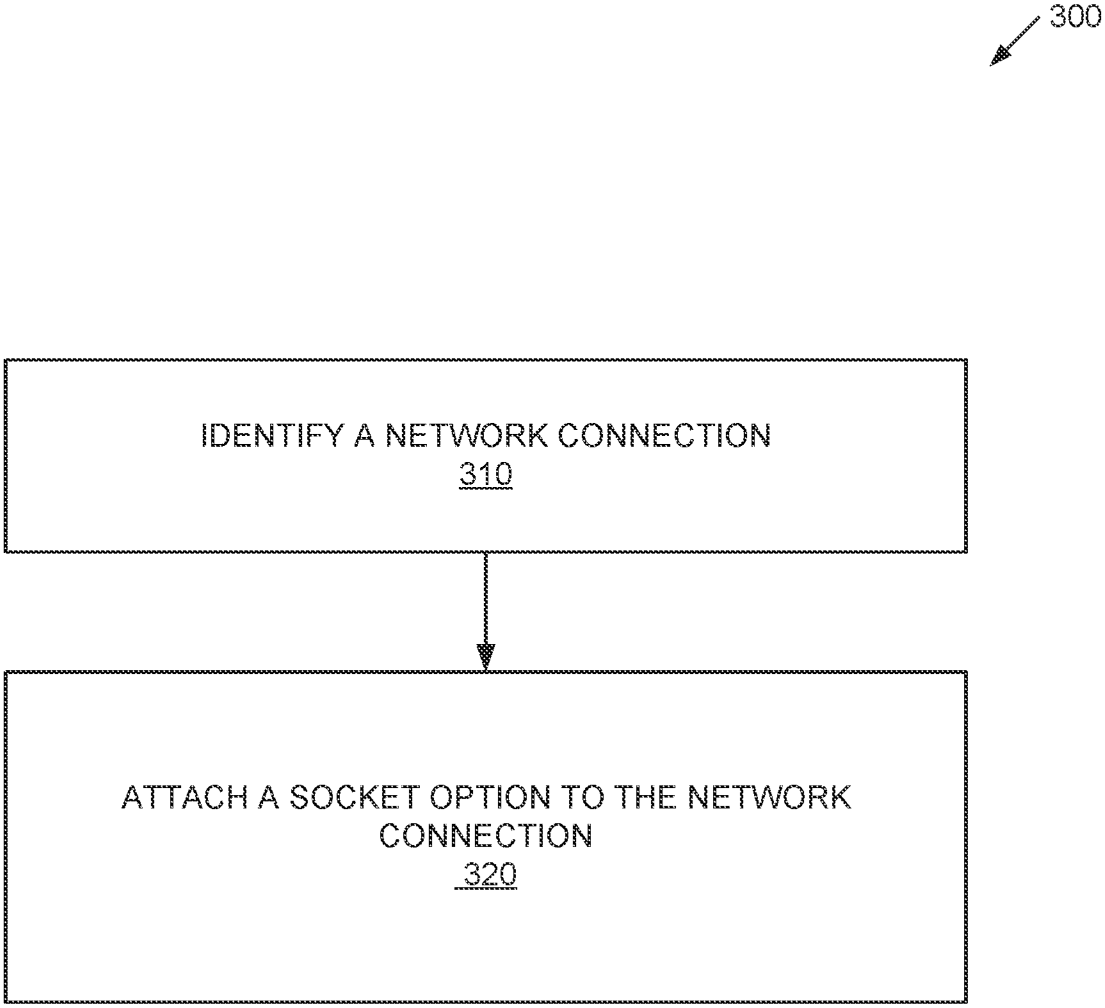
FIG. 3 depicts a flow diagram of an example method of creating a socket option in accordance with one or more aspects of the disclosure.

Referring to FIG. 3, at operation 310, the processing logic identifies a network connection. In some implementations, the processing logic identifies a network connection when a new connection is created. At operation 320, the processing logic attaches a socket option to the network connection. In some implementations, the socket option is in a form of a bit flag, and the bit flag is attached to or added to an endpoint identifier of the network connection. In some implementations, the existence or non-existence of the socket option represents the data packet is end-to-end encrypted or not, respectively. In some implementations, the socket option is the bit flag that can be set as 1 or 0, where "1" means that the data packet is end-to-end encrypted, and "0" means that the data packet is not end-to-end encrypted. In some implementations, the socket option is de-activatable. For example, when a socket option has been attached to the network connection indicating that the data packet transmitted through the network connection is end-to-end encrypted, the processing logic can deactivate the socket option so that the data packet is considered as a normal data packet. In some implementations, the socket option is automatically activated for the network connection that is created by an operating system having an encryption function, for example, provided by encryption engineer 233.

Figure 4:
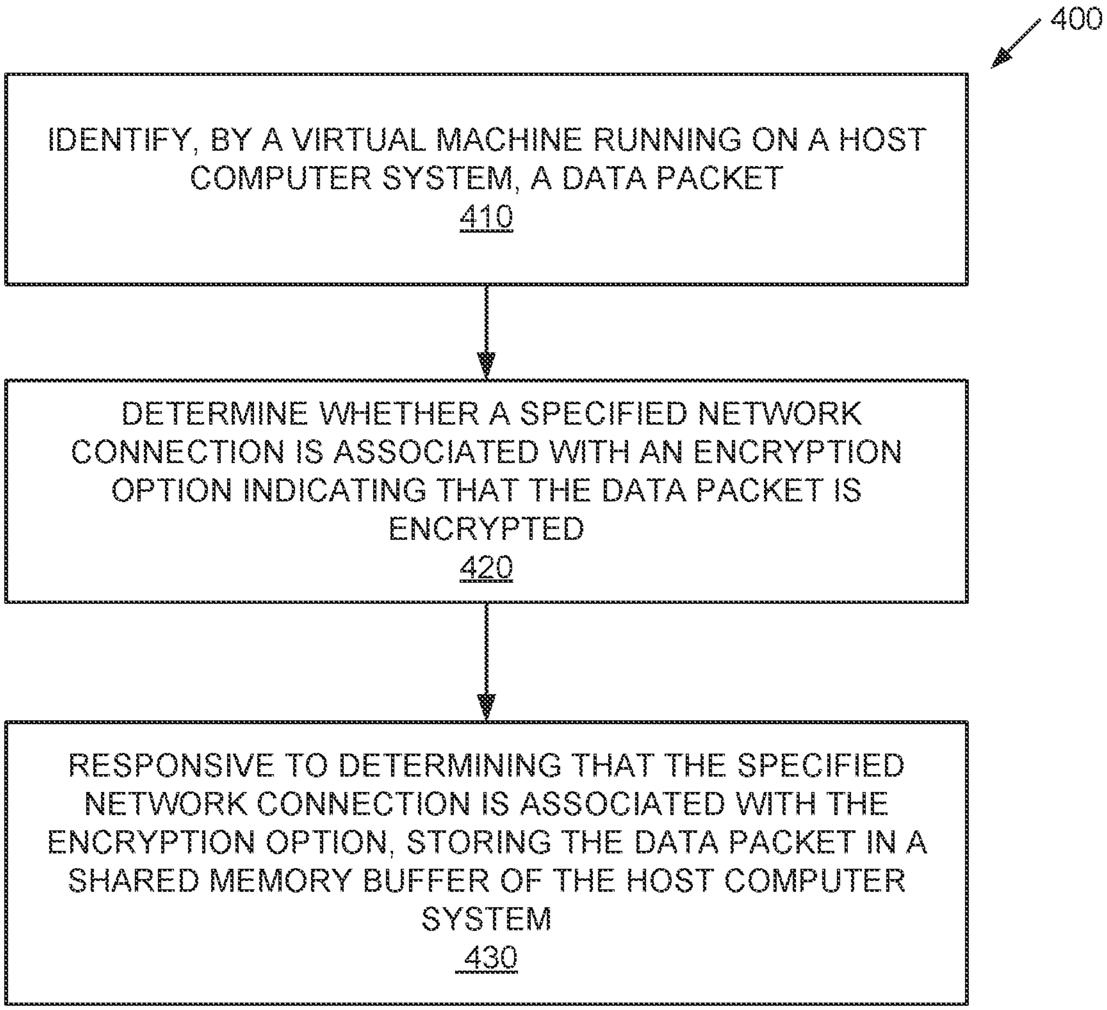
FIG. 4 depicts a flow diagram of an example method of overhead reduction in accordance with one or more aspects of the disclosure.

Referring to FIG. 4, at operation 410, the processing device identifies, by a virtual machine running on a host computing device, a data packet. At operation 420, the processing device determines whether a specified network connection is associated with an encryption option indicating that the data packet is encrypted. In some implementations, the encryption option is represented by a flag in a socket associated with the specified network connection. In some implementations, the processing device determines that a specified network connection is associated with an encryption option when it finds a flag in an endpoint identifier of the specified network connection.

In some implementations, the processing device can determine that the specified network connection is associated with a socket option when the application that sends the data packet has an encryption function. For example, the processing device may have the information about end-to-end encryption for the data packet to make the determination.

In some implementations, the processing device can determine that the specified network connection is associated with a socket option when a head of the data packet includes information regarding the specified network connection, where the information indicates the specified network connection has a bit flag representing the socket option and/or the bit flag with value "1." The processing device can determine that the specified network connection is not associated with a socket option when a head of the data packet includes information regarding the specified network connection, where the information indicates the specified network connection does not have a bit flag representing the socket option and/or the bit flag with value "0."

At operation 430, responsive to determining that the specified network connection is associated with the socket option, the processing device stores the data packet in a shared memory buffer of the host computer system. In some implementations, the processing device stores the data packet to the shared memory buffer by copying the data packet from the private memory to the shared memory buffer. In some implementations, the processing device may find that the data packet is already in the shared memory and the processing device would just keep the data packet stored in the shared memory and notify other components regarding this fact. The different scenario will be illustrated in detail with respect of FIGS. 5 and 6.

In some implementations, responsive to determining that the specified network connection is not associated with the socket option, the processing device copies the data packet from a private memory of the virtual machine to a buffer of an operating system of the virtual machine, and the processing device copies the data packet from the buffer of the operating system to the shared memory of the virtual machine.

Figure 5:
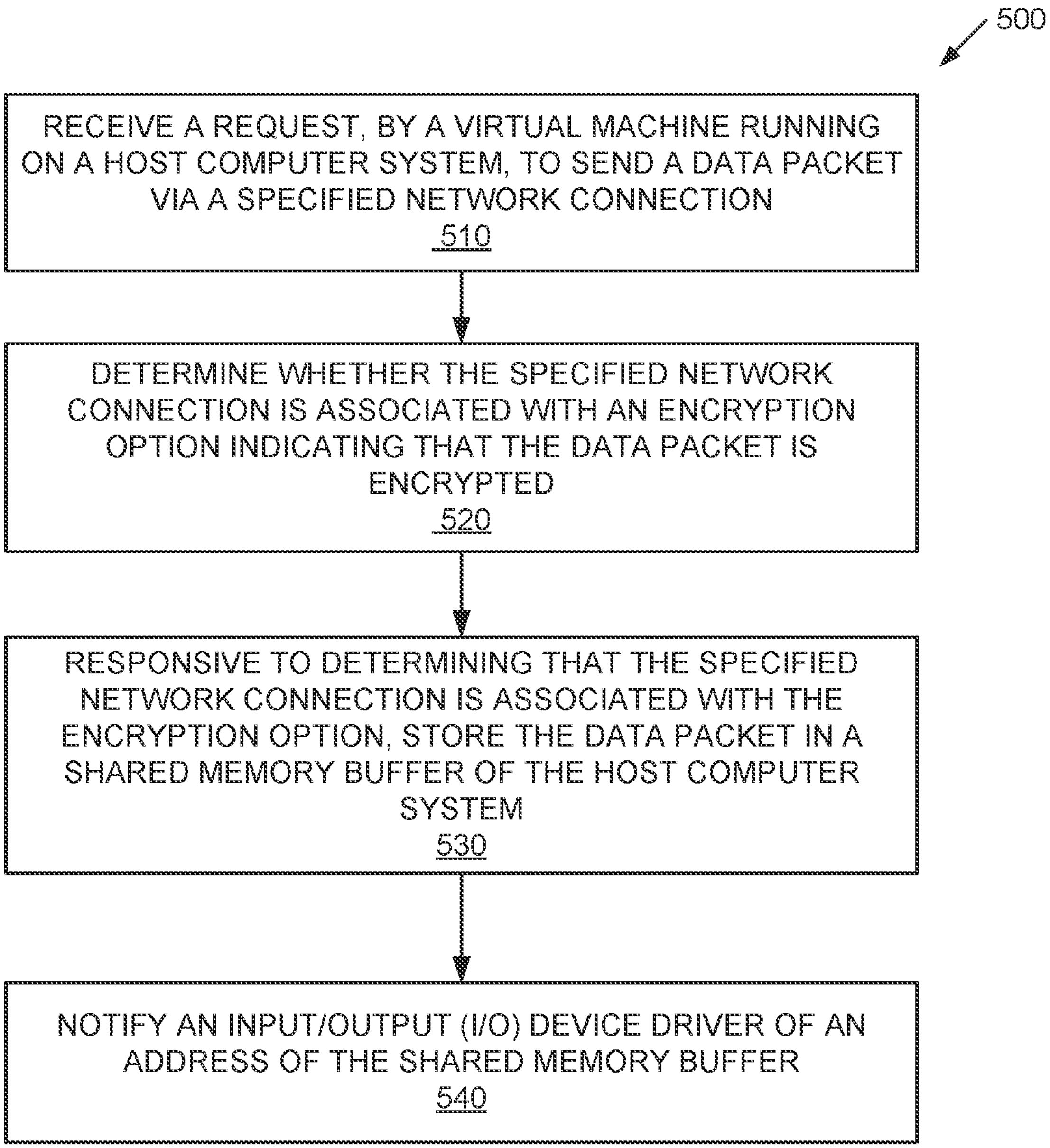
FIG. 5 depicts a flow diagram of an example method of overhead reduction for sending a data packet in accordance with one or more aspects of the disclosure.

Referring to FIG. 5, at operation 510, the processing device receives a request, by a virtual machine running on a host computer system (or an application running on the virtual machine), to send a data packet via a specified network connection. At this time, the data packet is stored in a private memory of the virtual machine, where the private memory is encrypted.

At operation 520, the processing device determines whether the specified network connection is associated with an encryption option indicating that the data packet is encrypted, which may be same as or similar to operation 420. In some implementations, the processing device already has the information that the data packet has been encrypted to make the determination.

At operation 530, responsive to determining that the specified network connection is associated with the socket option, the processing device stores the data packet to a shared memory buffer of the virtual machine. The processing device stores the data packet by copying the data packet from the private memory to the shared memory, and no intermedia buffer will be used for this copy.

At operation 540, the processing device sends, to a recipient that is indicated in the request, an address of the shared memory associated with the data packet. The address would serve as a notification that the data packet is in a shared memory. In the case that the recipient already has access to the shared memory, the recipient would not need to copy the data packet to store in its own memory. In some implementations, the processing device send the address via a NIC.

Figure 6:
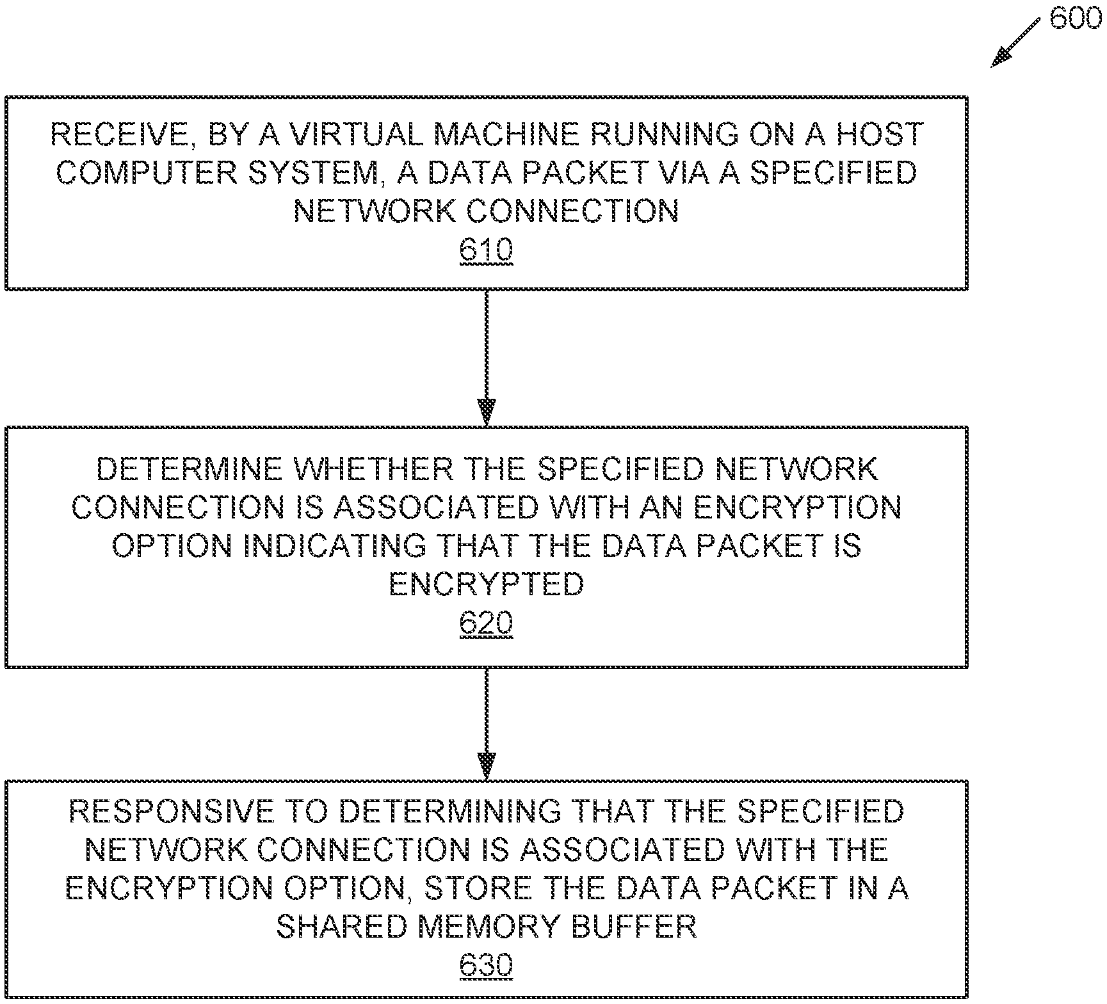
FIG. 6 depicts a flow diagram of an example method of overhead reduction for receiving a data packet in accordance with one or more aspects of the disclosure.

Referring to FIG. 6, at operation 610, the processing device receives, by a virtual machine running on a host computer system (or an application running on the virtual machine), a data packet via a specified network connection. In some implementations, the processing device received the data packet via a NIC. At this time, the data packet is stored in a shared memory of the virtual machine, where the private memory is un-encrypted.

At operation 620, the processing device determines whether the specified network connection is associated with an encryption option indicating that the data packet is encrypted, which may be same as or similar to operation 420. In some implementations, the processing device checks the header of the data packet to make the determination. For example, the processing device may copy the header of the data packet to a buffer used by a guest operating system to determine whether the header includes the information indicating a specified network connection used for communication of the data packet is attached with a socket option.

At operation 630, responsive to determining that the specified network connection is associated with the encryption option, the processing device stores the data packet in a shared memory buffer, and stores in a private memory of the virtual machine, an address of the shared memory associated with the data packet. The processing device keeps the data packet stored in the shared memory, and neither intermedia buffer nor copying from the shared memory to a private memory will be used. The address would serve as a notification that the data packet is in a shared memory. In the case that the data packet is to be sent to other internal or external components later, the processing device would not need to copy the data packet from a private memory to a shared memory.

Figure 7:
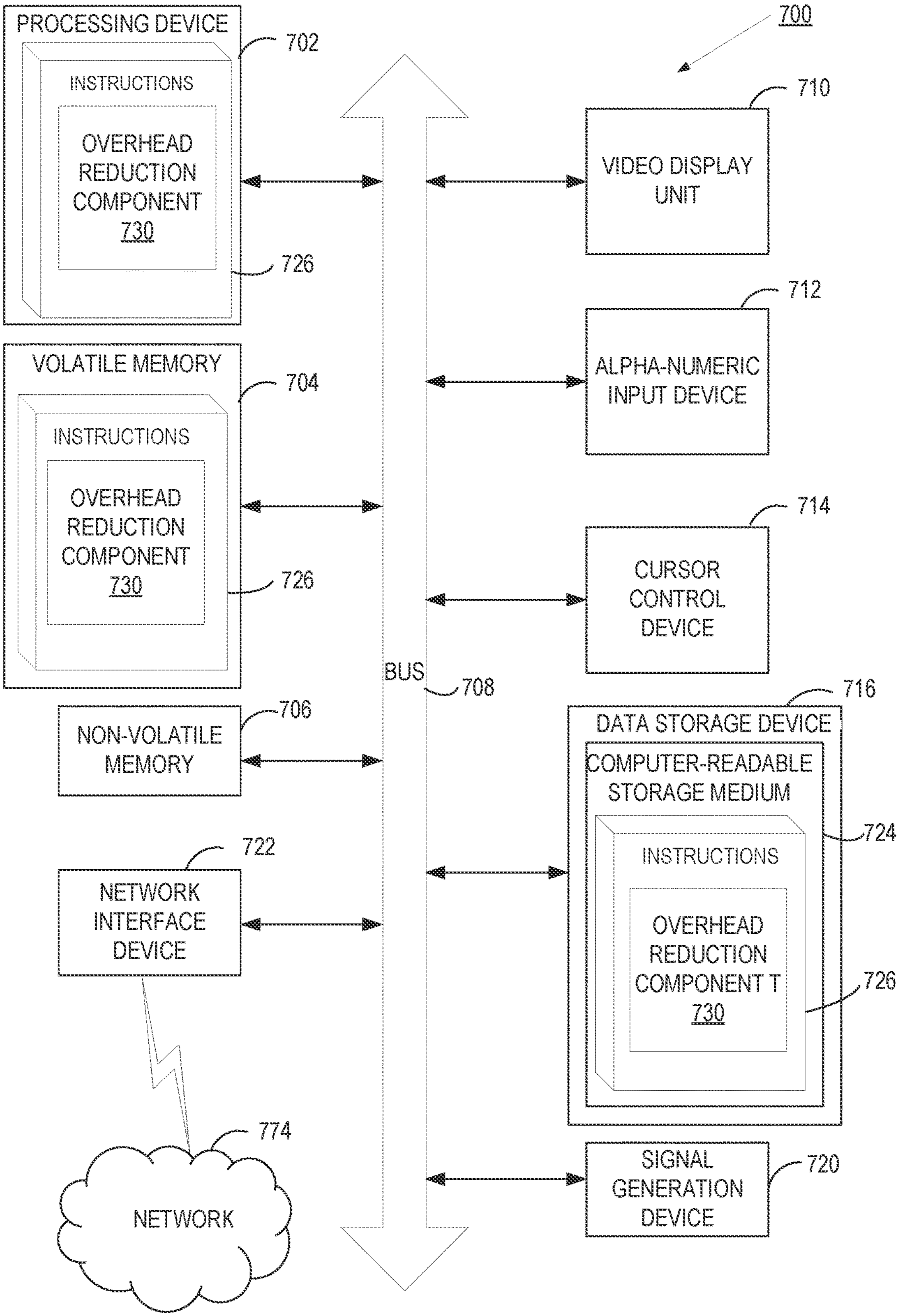
FIG. 7 depicts a block diagram of an illustrative computing device operating in accordance with the examples of the disclosure.

FIG. 7 depicts a block diagram of a computer system operating in accordance with one or more aspects of the disclosure. In various illustrative examples, computer system 700 may correspond to a computing device, such as computer system 100 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for an overhead reduction component 730 (e.g., overhead reduction component 104A, 104B, 240 of FIGS. 1 and 2 for implementing methods 300, 400, 500 and/or 600 of FIGS. 3, 4, 5, and 6.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs. Other computer system designs and configurations may also be suitable to implement the system and methods described herein.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600, and 700 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:

receiving, by a virtual machine (VM) running on a host computer system, a request to send a data packet to a specified recipient via a network, the VM comprising an encrypted memory inaccessible to a hypervisor and to any other VMs executing on the host computer system;

identifying, by the VM, a network connection to the specified recipient;

determining, by the VM, whether the data packet is encrypted based on determining that the identified network connection is associated with an encryption option indicating data encryption;

responsive to determining that the data packet is encrypted, storing the data packet in a shared memory buffer of the host computer system, wherein storing the data packet in the shared memory buffer comprises copying the data packet from a private memory of the virtual machine to the shared memory buffer and wherein the shared memory buffer is accessible to the specified recipient; and sending, to the specified recipient, an address of the shared memory buffer in lieu of the data packet.

2. The method of claim 1, wherein the encryption option is represented by a flag in a socket data structure associated with the identified network connection.

3. The method of claim 1, further comprising:

automatically activating the encryption option for a network connection created by an operating system having an encryption function.

4. The method of claim 1, further comprising:

storing a header along with the data packet in the shared memory buffer.

5. The method of claim 4, wherein the header includes information regarding the address of the shared memory buffer.

6. The method of claim 1, wherein the private memory is the encrypted memory.

7. A system comprising:

a memory; and a processing device operatively coupled to the memory, the processing device to:

receive, by a virtual machine (VM) running on a host computer system, a data packet via a specified network connection, the VM comprising an encrypted memory inaccessible to a hypervisor and to any other VMs executing on the host computer system;

determine, by the VM, whether the data packet is encrypted based on determining that the specified network connection is associated with an encryption option indicating that the data packet is encrypted, wherein the encryption option comprises at least one of a parameter of a system call associated with the specified network connection, a parameter of the specified network connection, or a flag in a socket data structure associated with the specified network connection;

responsive to determining that the data packet is encrypted:

store the data packet in a shared memory buffer, wherein the shared memory buffer is accessible to a specified recipient; and store an address of the shared memory buffer associated with the data packet in the encrypted memory in lieu of sending the data packet, wherein the data packet is operable to be retrieved from the shared memory buffer by the specified recipient.

8. The system of claim 7, wherein the processing device is further to:

automatically activate the encryption option for a network connection created by an operating system having an encryption function.

9. The system of claim 7, wherein the data packet comprises a header and user data, and wherein the header includes information regarding transmission of the user data.

10. The system of claim 9, wherein, to determine whether the specified network connection is associated with the encryption option, the processing device is further to:

determine, based on the header, whether the specified network connection is associated with the encryption option.

11. A non-transitory machine-readable storage medium including instructions that, when accessed by a processing device of a host computer system, cause the processing device to:

receive, by a virtual machine (VM) running on a host computer system, a request to send a data packet to a specified recipient via a network, the VM comprising an encrypted memory inaccessible to a hypervisor and to any other VMs executing on the host computer system;

identify, by the VM, a network connection to the specified recipient;

determine whether the data packet is encrypted based on determining that the identified network connection is associated with an encryption option indicating that the data packet is encrypted;

responsive to determining that the data packet is encrypted, store the data packet in a shared memory buffer of the host computer system, wherein to store the data packet in the shared memory buffer the processing device is further to copy the data packet from a private memory of the virtual machine to the shared memory buffer and wherein the shared memory buffer is accessible to the specified recipient; and send, to the specified recipient, an address of the shared memory buffer in lieu of the data packet.

12. The non-transitory machine-readable storage medium of claim 11, wherein the encryption option is represented by a flag in a socket data structure associated with the specified network connection.

13. The non-transitory machine-readable storage medium of claim 11, wherein the processing device is further to:

automatically activate the encryption option for a network connection created by an operating system having an encryption function.

14. The non-transitory machine-readable storage medium of claim 11, wherein the processing device is further to:

store a header along with the data packet in the shared memory buffer.

15. The non-transitory machine-readable storage medium of claim 11, wherein, to determine whether the specified network connection is associated with the encryption option, the processing device is further to:

determine, based on a header included in the data packet, whether the specified network connection is associated with the encryption option.

16. The non-transitory machine-readable storage medium of claim 11, wherein the processing device is further to:

save the address of the shared memory buffer.

* * * * *